E. SCHNEIDER.
COMBINED DISSOLVING VIEW APPARATUS AND MOVING PICTURE MACHINE.
APPLICATION FILED APR. 20, 1911.
1,172,567.  Patented Feb. 22, 1916.
5 SHEETS—SHEET 2.
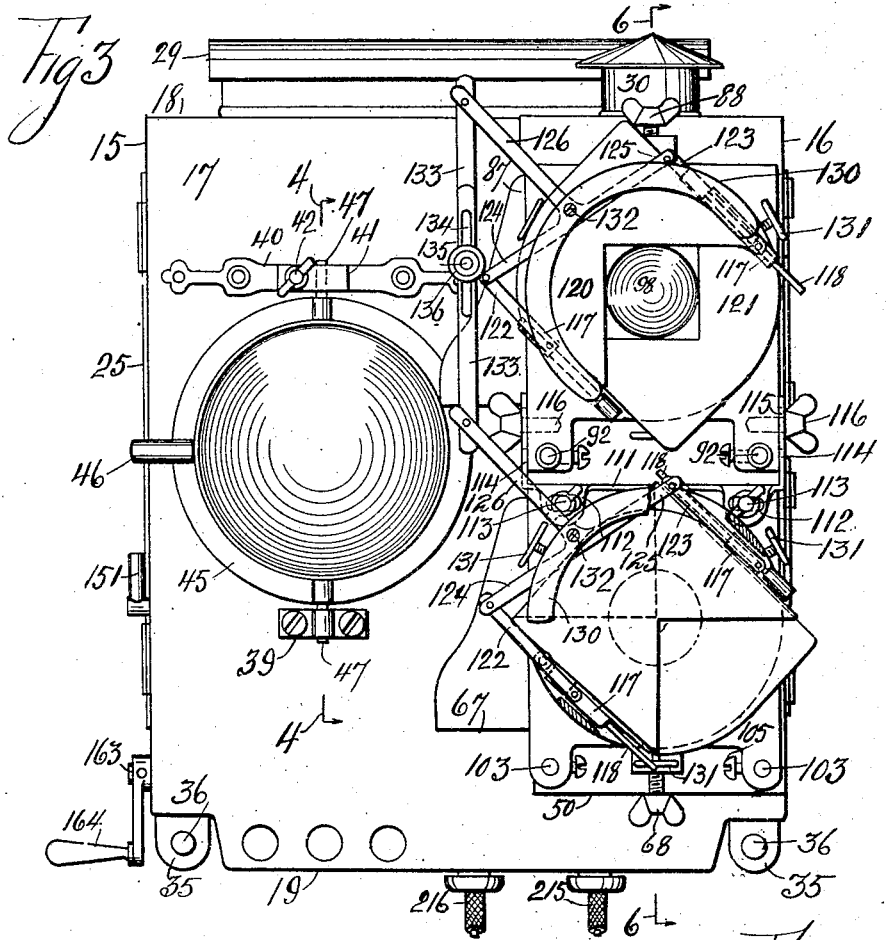
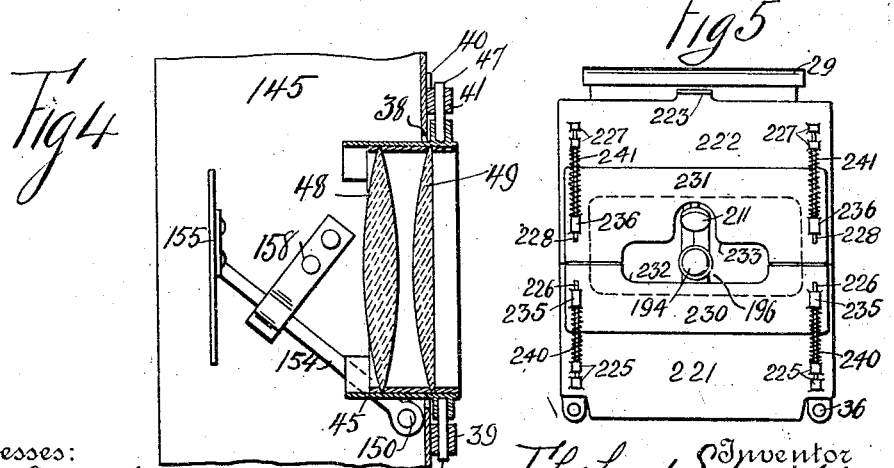

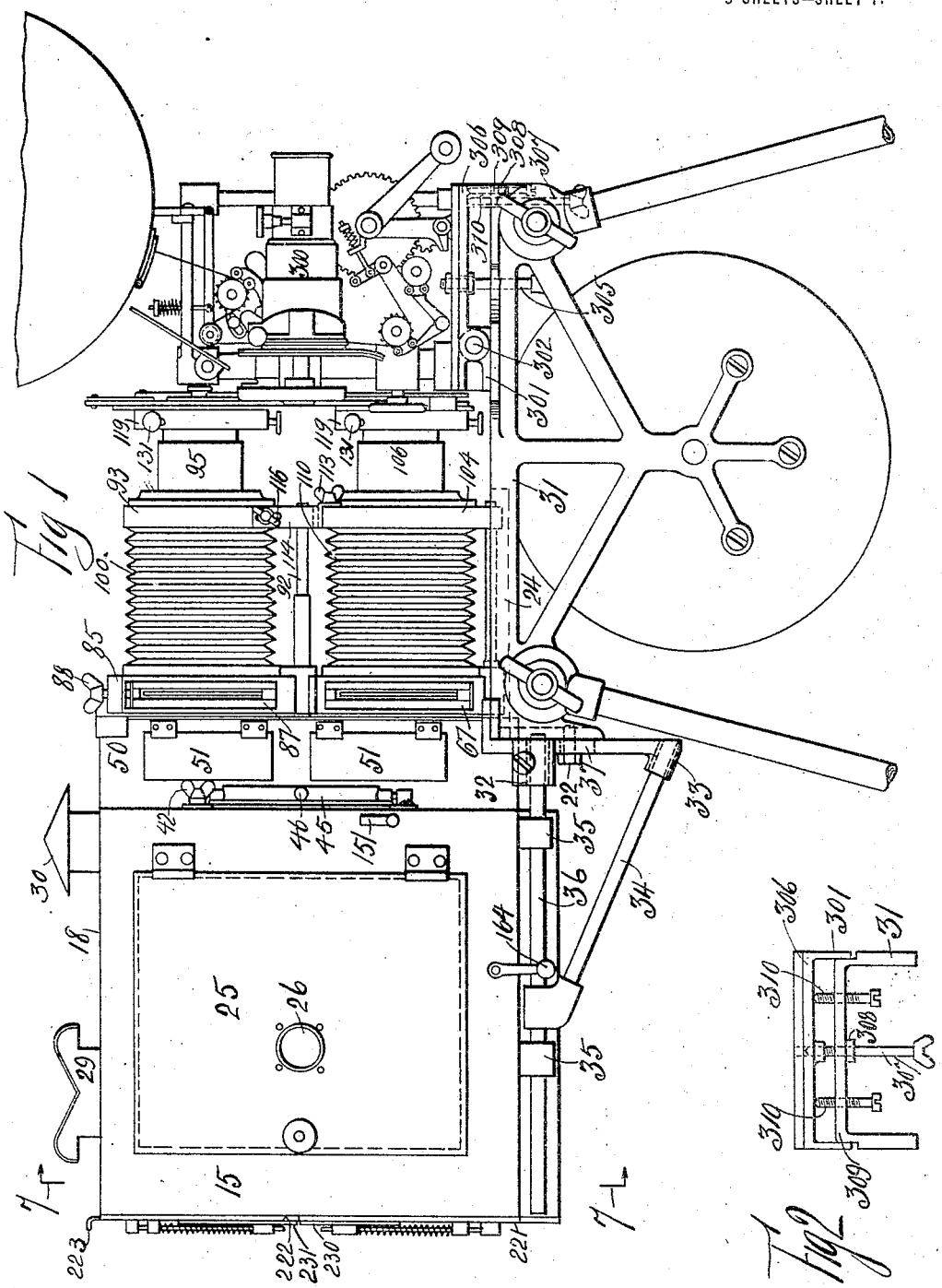

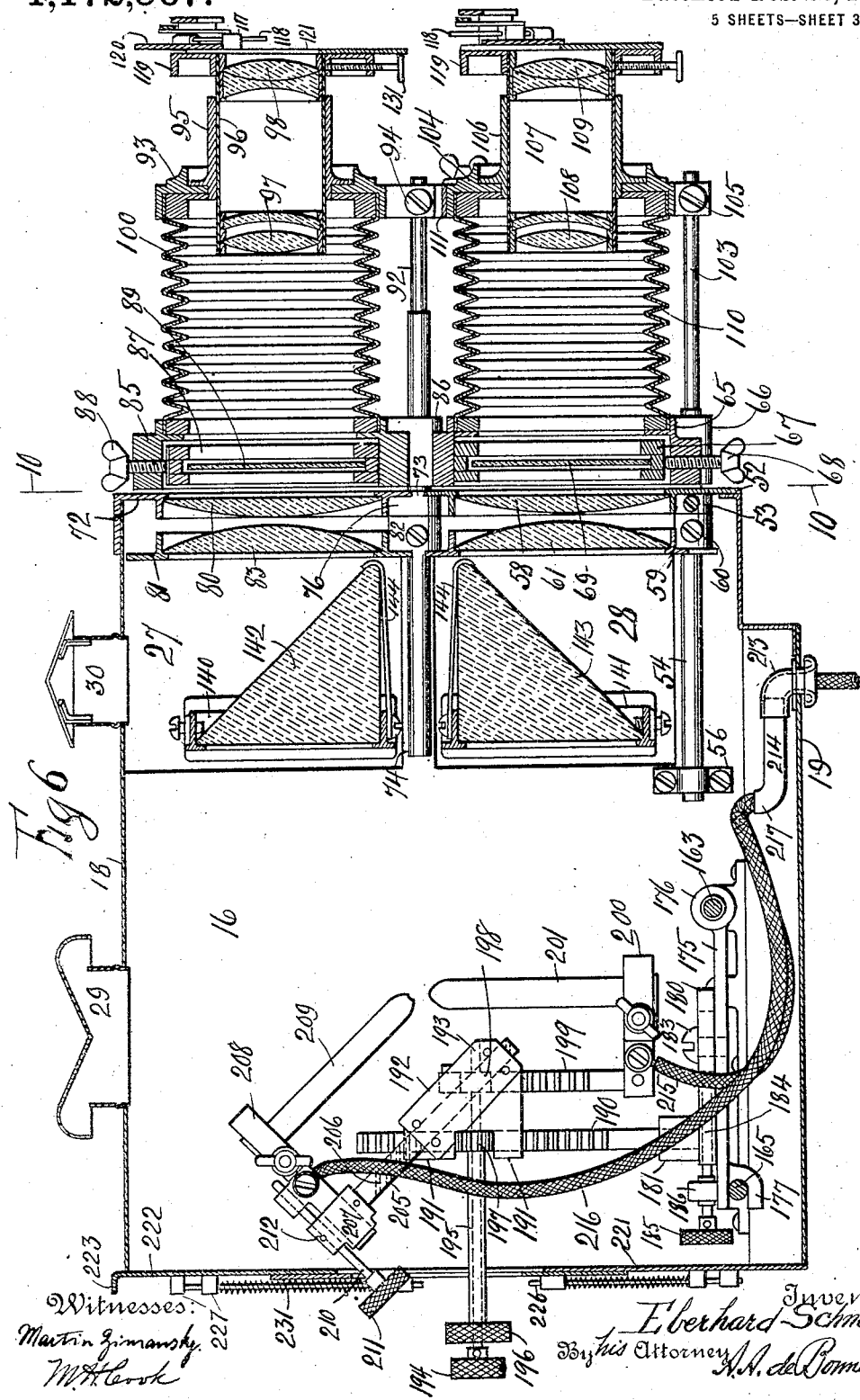

E. SCHNEIDER.
COMBINED DISSOLVING VIEW APPARATUS AND MOVING PICTURE MACHINE.
APPLICATION FILED APR. 20, 1911.
1,172,567.
Patented Feb. 22, 1916.
5 SHEETS—SHEET 4.
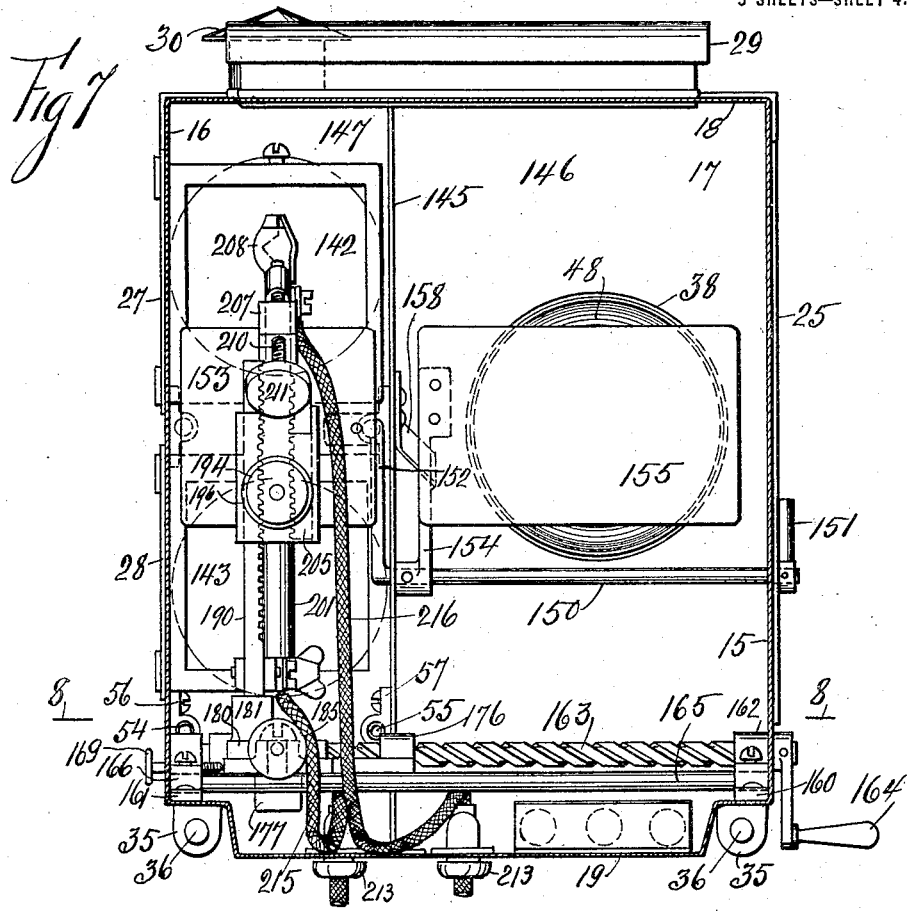
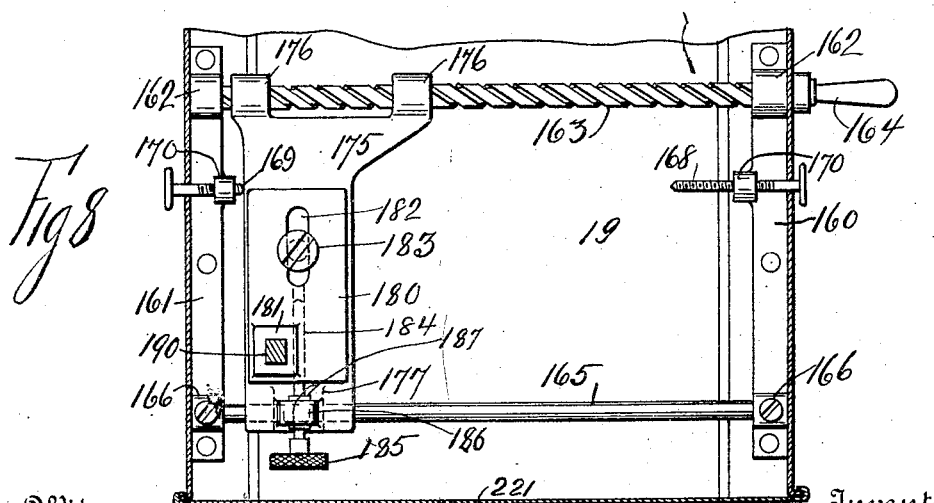

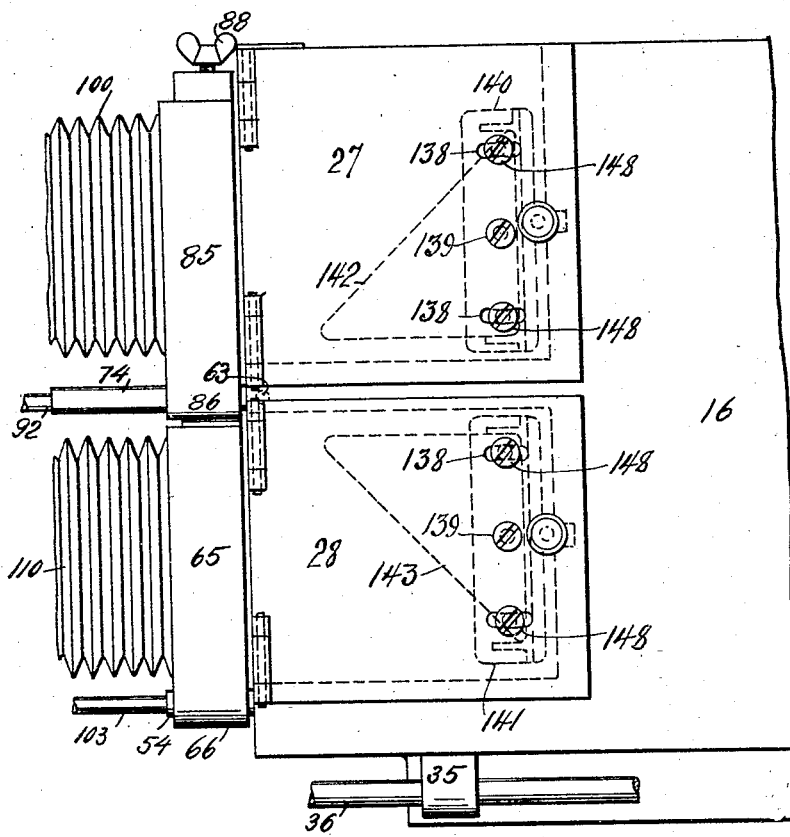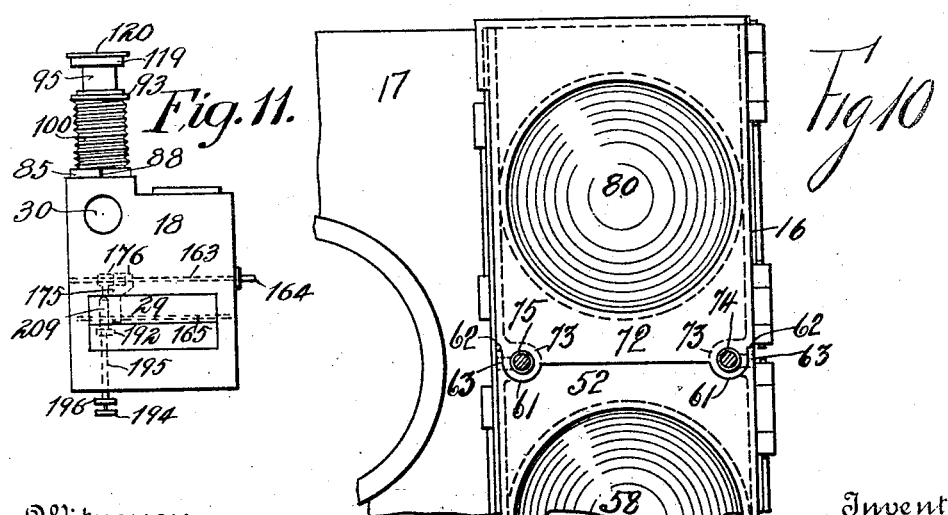

UNITED STATES PATENT OFFICE.

EBERHARD SCHNEIDER, OF NEW YORK, N. Y.

COMBINED DISSOLVING-VIEW APPARATUS AND MOVING-PICTURE MACHINE.

1,172,567.  Specification of Letters Patent.  Patented Feb. 22, 1916.

Application filed April 20, 1911.  Serial No. 622,198.

*To all whom it may concern:*

Be it known that I, EBERHARD SCHNEIDER, a citizen of the United States, and a resident of the borough of Manhattan, in the county of New York and State of New York, have invented certain new and useful Improvements in Combined Dissolving-View Apparatus and Moving-Picture Machines, of which the following is a specification.

This invention relates to a combined dissolving view apparatus and moving picture machine.

The appurtenances of the dissolving view apparatus are improvements of my invention described and claimed in my United States Patent No. 953,105, bearing date March 29th, 1910, entitled Optical projecting apparatus.

The invention is characterized by a single lantern with a single source of light, in which a pair of prisms of triangular cross-section reflect the light rays to a pair of condensers. From the latter the light enters a pair of objectives. With the objectives are mounted specially operated dissolving shutters arranged so that while the light is being admitted through one it is simultaneously shut off from the other.

A third condenser is connected with the lantern to transmit rays of light to a moving picture projecting apparatus which is in the axial line of the latter condenser. A shutter in the lantern can cut off the light from the prisms and a second shutter can cut off the light from the condenser for the moving picture machine.

A distinguishing feature of the invention comprises means to move the source of light, so that it can be located either in line with the prisms or the condenser for the picture machine.

Figure 1 shows a side elevation of the invention, Fig. 2 represents a fragmentary left hand portion of the moving picture machine, Fig. 3 is an enlarged right hand side view of a portion of Fig. 1 with the moving picture machine removed, Fig. 4 is a partial section of Fig. 3 on the line 4, 4, Fig. 5 represents a partial left hand end view of Fig. 1 on a reduced scale, Fig. 6 shows a partial section as on the line 6, 6 of Fig. 3, Fig. 7 is a partial enlarged section of Fig. 1 on the line 7, 7, Fig. 8 represents a partial section of Fig. 7 on the line 8, 8, Fig. 9 shows a partial rear view of Fig. 6, Fig. 10 shows a partial section as on the line 10, 10 of Fig. 6 and Fig. 11 shows a diagrammatic and top plan view of the invention.

A lantern of the invention is shown with the sides 15, 16, front 17, roof 18, bottom 19, and rear cover to be described.

To the side 15 is hinged the door 25 with a peep hole having a cover 26 preferably of glass, and to the side 16 are hinged the doors 27 and 28. In the roof 18 are formed openings with the hoods 29 and 30, and from the bottom 19 extend the guide blocks 35 that are slidably supported on the guide rods 36 carried by an adjustable bracket 37 of a supporting frame 31 with the cavity 24. Insulating material 32 is shown between the rods 36 and the bracket 37. Bracket rods 34 carried by the bracket 37 and insulated therefrom as shown at 33 also support the rods 36.

The bracket 37 can be located at different levels by means of a bolt 22 so that the lantern with its appurtenances can at all times be insulated from the frame 31. A pivot bracket 39 is fastened to the front 17 below the opening 38 and a pivot bracket 40 is fastened to said front above said opening. The bracket 40 has the adjustable portion 41 controlled by the screw 42. A condenser housing 45 having the handle 46 covered with insulating material extends through the opening 38. Pivots 47 on said housing are engaged by the brackets 39 and 40. The diameter of the opening 38 is somewhat larger in diameter than the outside diameter of the housing 45, by virtue of which the latter can be adjusted vertically, and swung to different angular positions on its pivots 47. Condenser lenses 48 and 49 are secured in the housing 45. A supplemental housing 50 extends from the lantern and has hinged thereto the doors 51. A lens bracket 52 is connected to the front of the supplemental housing and has formed therewith lugs 53 at the lower portion thereof which engage the hollow guide rods 54, 55 that are respectively fastened to the side wall 16 by means of the bracket 56, and to the opposite side of the lantern by means of the bracket 57. A condenser lens 58 is supported in the bracket 52 and the upper edge of the bracket 52 has formed therewith bearing faces 61 from which extend ears 62 for the pivots 63. A lens bracket 59 adjacent to the bracket 52 has extending therefrom lugs 60 that are fastened to the hollow guide rods 54, 55 and a condenser lens 61 is supported in the bracket 59.

A slide carrier frame 65 has extending therefrom the lugs 66 which are fastened to the hollow guide rods 54, 55. A slide carrier 67 is secured in the frame 65 by means of the clamping screw 68, and a picture slide 69 is located in the carrier 67. A lens bracket 72 is located above the bracket 52 and has formed therewith lugs 73 that encircle the hollow guide rods 74, 75 and which lugs are pivoted to the ears 62 by means of the pivots 63.

A condenser lens 80 is supported in the bracket 72. A lens bracket 81 accompanies the bracket 72 and has extending therefrom lugs 82 that are fastened to the hollow guide rods 74 and 75. A condenser lens 83 is secured in the bracket 81. A slide carrier frame 85 has extending therefrom the lugs 86 that are fastened to the guide rods 74, 75. A slide carrier 87 is secured to the bracket 85 by means of the clamping screw 88, and a picture slide 89 is located in the carrier 87.

Rods 92 telescope with the rods 74, 75 and carry at their ends a lens support 93 which latter is fastened in place by means of the screws 94. A lens guide 95 is supported in the support 93 and in the latter is slidably supported the lens box 96 of the upper objective containing the lenses 97 and 98. Between the slide carrier frame 85 and support 93 is interposed the bellows 100. Rods 103 telescope with the rods 54, 55 and carry at their ends a lens support 104, which latter is fastened in place by means of the screws 105. A lens guide 106 is supported in the support 104 and in the latter is slidably supported the lens box 107 of the lower objective containing the lenses 108 and 109. Between the support 104 and the bracket 65 is interposed the bellows 110. A bracket 111 with the lugs 112 having elongated openings is adjustably connected to the support 104 by means of the screws 113. Lugs 114 with elongated openings 115 extend from the bracket 111 and engage the support 93 by means of the screws 116. It will be noted that the supports 93 and 104 are relatively and horizontally adjustable to each other by means of the bracket 111 and thereby the upper and lower objectives are similarly adjustable.

A pair of shutters with rectangular openings are shown with the portions 120, 121 that have formed therewith the guide lugs 117. Links 122, 123 have each one end pinned to said lugs 117, and the other ends thereof are respectively pinned to the arms 124 and 125 of a bell crank having each a third arm 126. Rings 119 are fastened to the lens boxes 96 and 107 by means of the screws 131 and have extending therefrom the parallel guide rods 118 for the lugs 117. The said bell cranks are pivoted by means of the pins 132 to a protecting ring 130 extending above each of the rings 119. The arms 126 are connected by the links 133, which have accompanying elongated openings 134 and are joined through said openings by a clamping screw 135 having the knurled nut 136. By vertically moving the links 133 one pair of shutters is opened, and simultaneously the other pair is closed.

In the doors 27 and 28 are formed slots 138 and frames 140, 141 are pivoted to said door by a pivot screw 139, and clamped in different positions by the screws 148 extending through said slots. Prisms 142, 143 are carried by the frames 140, 141 and supports 144 extend from said frames and engage the ends of said prisms. A partition 145 in the lantern divides the same into separate light chambers 146 and 147.

A shutter rod 150 with an insulated handle 151 at one end extends through the side 15 and the partition 145. The rod 150 carries the arm 152 that supports the shutter 153 and an arm 154 on the rod 150 carries the shutter 155. To the partition 145 is fastened a spring catch 158 for locking the arm 154 in place. The shutters 153 and 155 can be simultaneously located in the paths of the light rays of the prisms 142, 143 and in the path of the light rays of the condenser lenses 48, 49. In the lantern are fastened the brackets 160, 161 which have formed therewith the journal bearings 162. In the latter is journaled a screw 163 having the operating handle 164. A guide rod 165 is supported in the lugs 166 formed with said brackets 160 and 161. Adjustable stop pins 168 and 169 are in threaded engagement with the lugs 170 extending from said brackets 160, 161.

A carriage 175 has formed therewith the lugs 176 that are in threaded engagement with the screw 163.

A lug 177 extends from the lower face of the carriage and is engaged with the guide rod 165. A plate 180 with the boss 181 and the elongated opening 182 is carried on the carriage 175. A screw 183 extending through the opening 182 allows the plate 180 to be moved on the carriage. A screw 184 with the knurled head 185 is in threaded engagement with the plate 180. The latter screw is supported in the lug 186 extending from the carriage 175, and has flanges 187 that bear against the opposite faces of said lug.

The boss 181 supports the rack bar 190 that extends through the lugs 191 that are formed with a bracket 192. The said bracket has journaled therein a pin 193 with the knurled head 194, and on which is supported a sleeve 195 having the knurled head 196. A pinion 197 on the sleeve 195 engages the teeth of the bar 190, and the frictional engagement of said pinion with said bar 190 maintains said bracket 192 in position thereon. A pinion 198 on the pin 193 engages a rack bar 199 that extends through an opening in the bracket 192. The lower end of the bar 199 supports a carbon holder 200 with the carbon 201. A ratchet bar 205 has formed therewith the inclined teeth 206 that mesh with the pinion 198. A bracket 207 extends from the upper end of the bar 205 and slidably carries the carbon holder 208 which supports the carbon 209. A screw 210 with the knurled head 211 is in threaded engagement with the carbon holder 208 and a pin 212 in the bracket 207 prevents the longitudinal displacement of the screw 210. Electric conductors 215 and 216 extend respectively from the carbon holders 200 and 208, and lead through swinging elbows 213 that have extending therefrom the fittings 214 with the turned up ends 217. The elbows 213 and their appurtenances may be coated with insulating material on their interior surfaces.

With the rear end of the lantern are formed flanges 220 for supporting cover plates 221 and 222. A lip 223 is formed with the cover plate 222. Lugs 225 extend from the cover plate 221 and support pins 226. Similar lugs 227 extend from the cover plate 222 from which latter extend pins 228. Plates 230 and 231 having respectively openings 232 and 233 are adjacent and can slide respectively on the plates 221 and 222. Lugs 235 are formed on the plate 230 and lugs 236 are formed on the plate 231. The pins 226 extend through the lugs 235 and the pins 228 extend through the lugs 236. Springs 240 encircle the pins 226 between the lugs 225 and 235 and springs 241 encircle the pins 228 between the lugs 227 and 236. The opening 232 and 233 is large enough to allow the sleeve 195 and the screw 210 to extend therethrough.

The picture machine is designated generally by the numeral 300. It is pivotally supported on an adjustable bracket 301 which is carried on the supporting frame 31 and has the trunnions 302. A binding screw 305 secures the picture machine axially to the plate 306 of the bracket 301. A screw 307 with a collar 308 is in threaded engagement with the plate 306, the collar 308 bearing up against the lower surface of the top plate 309 of the frame 31. Screws 310 in threaded engagement with the plate 309 bear up against the plate 306.

To use the invention the operator adjusts the picture machine 300 in proper position by means of the screws 307 and 310 so that the pictures of the machine are reflected at the right level upon a screen. Then after the picture slides 69 and 89 are respectively located in their carrier, the shutters 153 and 155 may be lowered so that the light rays may enter the prisms 142, 143 for the dissolving view apparatus or the condenser lenses 48, 49 for the picture machine depending upon the location of the carbons 209, 201, which locations are controlled by the operating handle 164. The turning of the said handle moves the carriage 175 and with it the said carbons which are the source of light. When the light rays are in proper line for the prisms the light enters both of the objectives with the lenses 97, 98 and 108, 109 if both of the shutters connected therewith are partially open. By moving the links 133 up or down one of said shutters open while the other is being closed, and one is fully open while the other is fully closed. When one of the shutters is fully closed its accompanying picture slide can be removed and a new one substituted. It will be noted that by means of the simultaneous operation of the shutter that a truly dissolving effect is produced without manipulating the light.

Having described my invention what I desire to secure by Letters Patent and claim is:

1. In an apparatus of the character described the combination of a supporting frame, a bracket adjustably connected thereto, a lantern of a dissolving view apparatus supported on said bracket, a pair of light chambers in the lantern, a single source of light in said lantern, means to move the light in line with each of said chambers, a pair of objectives connected to said lantern for the dissolving view apparatus, a moving picture machine adjustably carried on the supporting frame, lenses in the lantern for the latter and means to move the light in said lantern.

2. In an apparatus of the character described the combination of a lantern, a pair of light chambers in the lantern, a single source of light in the lantern, means to move the source of light to coact with either of said chambers, a pair of prisms in the lantern, a pair of condenser lenses for each prism, an objective for each of said condensers, a third pair of condenser lenses in the lantern, and shutters between the latter condenser lenses and the source of light and a shutter between the prisms and the source of light.

3. In an apparatus of the character described the combination of a lantern, a carriage in the lantern, a source of light carried by said carriage, means to move the carriage, a pair of prisms in the lantern, a pair of objectives coacting with said prisms, a pair of condenser lenses in the lantern, and a picture machine coacting with said lenses.

4. In an apparatus of the character described the combination of a supporting frame, a lantern on said frame, a carriage in said lantern, a source of light carried by said carriage, means to move the carriage, a pair of prisms in the lantern, a pair of condenser lenses opposite each prism, an objective axially in line with each pair of condenser lenses, a third pair of condenser lenses connected to the lantern, a moving picture machine on the frame coacting with the latter condenser lenses, a shutter between the source of light and said prisms and a shutter between the source of light and the third pair of condensers.

Signed at the borough of Manhattan, in the county of New York and State of New York, this 14th day of April, A. D. 1911.

EBERHARD SCHNEIDER.

Witnesses:
A. A. DE BONNEVILLE,
MARGARETHE SCHNEIDER.

Copies of this patent may be obtained for five cents each, by addressing the "Commissioner of Patents, Washington, D. C."